United States Patent [19]

Dupré et al.

[11] 3,767,168

[45] Oct. 23, 1973

[54] MECHANICAL AGITATION APPARATUS

[75] Inventors: George T. Dupré, Palatine; Thomas M. DeMarco, Chicago, both of Ill.

[73] Assignee: National Foundry Equipment Company, Inc., Palatine, Ill.

[22] Filed: Sept. 27, 1971

[21] Appl. No.: 184,288

Related U.S. Application Data

[62] Division of Ser. No. 38,166, May 18, 1970, Pat. No. 3,618,668.

[52] U.S. Cl. ............... 259/72, 164/203, 425/456
[51] Int. Cl. ............................................ B22c 15/10
[58] Field of Search .......................... 164/203, 39; 425/432, 456, 424; 259/72, DIG. 42

[56] References Cited
UNITED STATES PATENTS

| | | | |
|---|---|---|---|
| 2,032,934 | 3/1936 | Horsch | 259/72 X |
| 3,153,834 | 10/1964 | Boyer et al. | 259/72 X |
| 2,719,346 | 10/1955 | Caciagli | 425/432 X |

*Primary Examiner*—Robert D. Baldwin
*Attorney*—Nate F. Scarpelli

[57] ABSTRACT

Method for continuous preparation of molds from mold flasks, matchplate mold patterns and mold forming material, wherein flasks are assembled with flask drag section atop pattern and flask cope section, the drag section is filled with mold forming material, the entire flask is inverted, the cope section is filled, and the pattern is removed, inverted and made available for use with other flask sections. Multi-station apparatus for mass production according to the method. Jolt apparatus employing double shaft contra-rotating motors as a source of mechanical agitation for compacting mold forming material in flask.

9 Claims, 13 Drawing Figures

Patented Oct. 23, 1973

MECHANICAL AGITATION APPARATUS

This is a divisional application of a co-pending application Ser. No. 38,166, now U.S. Pat. No. 3,618,668.

BACKGROUND OF THE INVENTION

This invention relates to novel apparatus for supplying mechanical agitation to containers and materials contained therein, which apparatus is exceptionally useful in compacting sand or other mold forming materials in a mold flask about a mold pattern.

Heretofore, preparation of foundry molds through the use of mold flasks and matchplate mold patterns has required extensive, costly and time consuming hand manipulation of flasks as well as the waste of extensive floor space in the foundry, all in the belief that no method or apparatus could be devised whereby all the necessary operations of such preparation could be performed automatically, continuously, and within a relatively small area of foundry space. Purportedly "automatic" apparatus heretofore devised for performing even a few of the necessary operations has been slow and far from completely automatic. Further, it has heretofore been the practice in supplying a sand compacting jolt to a mold flask that mechanical jolting apparatus is repeatedly started and stopped to allow for positioning, securing and release of each flask to be jolted, with consequent expenditure of substantial amounts of time.

SUMMARY OF THE INVENTION

The present invention provides for completely automatic and continuous mass production of high quality foundry molds in a fast, economical and efficient manner requiring neither hand manipulation of mold flasks and patterns nor consumption of excessive amounts of foundry floor space. The invention further provides fast and efficient jolting apparatus having a continuously operating mechanical agitation source which may be instantly engaged to jolt a flask and means permitting positioning, securing and releasing of a flask without time consuming starting and stopping of the agitation source.

An aspect of the present invention provides a multi-station apparatus including ten stations, positioned in a pattern generally rectangular in shape, said stations being a first, Flask Insert station, second, Pattern Insert station, a third, Drag Fill station, a fourth, Idler station, a fifth, Flask Rollover station, a sixth, Cope Fill station, a seventh, Squeeze station, an eighth, Pattern Removal station, a ninth, Pattern Rollover station, and a tenth Flask Removal station. In this aspect of the invention, a flask is supplied at the first station with the drag section atop the cope section, a matchplate mold pattern is positioned between the sections at the second station, and the assembled flask and pattern thereafter passes through each of the third through eighth stations in sequence. At the eighth station the flask sections with completed mold are separated and the pattern is moved to the ninth station where it is inverted for possible re-use with other flask sections. At the tenth station, the flask sections are removed for further processing.

A further aspect of the invention provides: first, "A," carriage means cabable of moving a flask from first to second stations while moving another flask from second to third stations, and still another flask from third to fourth stations; multiple hydraulic cylinder means capable of moving a flask from fourth to fifth stations while moving another flask from fifth to sixth stations; second, "B," carriage means capable of moving a flask from sixth to seventh stations while moving another flask from seventh to eighth stations and spaced apart flask sections from eighth to tenth stations; and motor means for simultaneously inverting a flask at the fifth station and a pattern at the ninth station.

Another aspect of the present invention provides for continuous, mass production of foundry molds of a single form through the use of six identical matchplate mold patterns which pass repeatedly through the apparatus.

Still another aspect of the present invention provides for change from mass preparation of one form of mold to another without substantial interruption of the mold preparation cycle of the apparatus.

A further aspect of the present invention provides for use of selectively engageable electromagnetic means to facilitate spacing apart and other operations on mold flasks and sections thereof.

DESCRIPTION OF THE DRAWINGS

The invention will be better understood from the following detailed description thereof taken in conjunction with the accompanying drawings in which.

Figure 13:
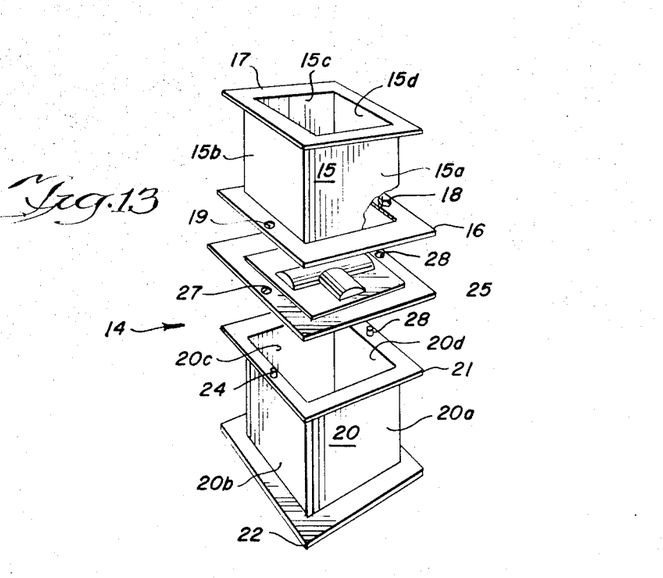
FIG. 13 is a perspective view of a mold flask and matchplate mold pattern suitable for use in the practice of the invention.

Referring first to FIG. 13, there is illustrated a mold flask 14 comprising cope 15 and drag 20 sections. Also shown is a matchplate mold pattern 25 suitable for use with flask sections 15, 20 in the practice of the invention.

Flask cope section 15 includes walls 15a, 15b, 15c and 15d and flanges 16, 17 which flanges extend outwardly and generally perpendicualrly from the walls. Similarly, flask drag section 20 includes walls 20a, 20b, 20c and 20d as well as flanges 21, 22. Cope flange 16 and drag flange 21, hereinafter referred to as "inner cope flange" and "inner drag flange" respectively, may be provided with apertures 18, 19 and projections 23, 24 (capable of fitting into apertures 18, 19). Providing such apertures and projections will permit positioning of one section atop the other in such a way that the sections are substantially interconnected and, at the incidence of a lateral force directed at the assembled flask or one of its sections, the sections will move together and not slide apart from each other.

Inner cope flange 16, inner drag flange 21 as well as cope flange 17 and drag flange 22, the latter two hereinafter referred to as "outer cope flange" and "outer drag flange" respectively, all may function as means by which a given section or an assembled flask may be supported. Thus, if the flask is assembled with cope 15 atop drag 20, the assembly may be horizontally supported by supporting either the inner 21 or outer 22 drag flanges. Similarly, if the flask is assembled with drag 20 atop cope 15, the assembly may be horizontally supported by supporting either the inner 16 or outer 17 cope flanges.

Preferably, at least portions of flask 14, specifically, flanges 16, 17, 21, 22, would be made of iron or other magnetically attractable material which would permit manipulation of a section or the assembled flask with electromagnetic means. Further, walls 15a, 15b, 15c and 15d of cope 15 as well as walls 20a, 20b, 20c and 20d of drag 20 may be constructed to taper inwardly from inner flange to outer flange for better retention of sand or mold forming material in the section when it is filled. It is also contemplated that flasks suitable for use in the practice of the invention may include "sand lock" means well known in the art to assist in retaining materials in filled sections.

Matchplate mold pattern 25 is preferably provided with apertures 26, 27 which coincide spatially with apertures 18, 19 of inner cope flange 16 and with projections 23, 24 of inner drag flange 21 so that cope 15 and drag 20 may be assembled with pattern 25 releasably secured therebetween.

Figures 1, 11:
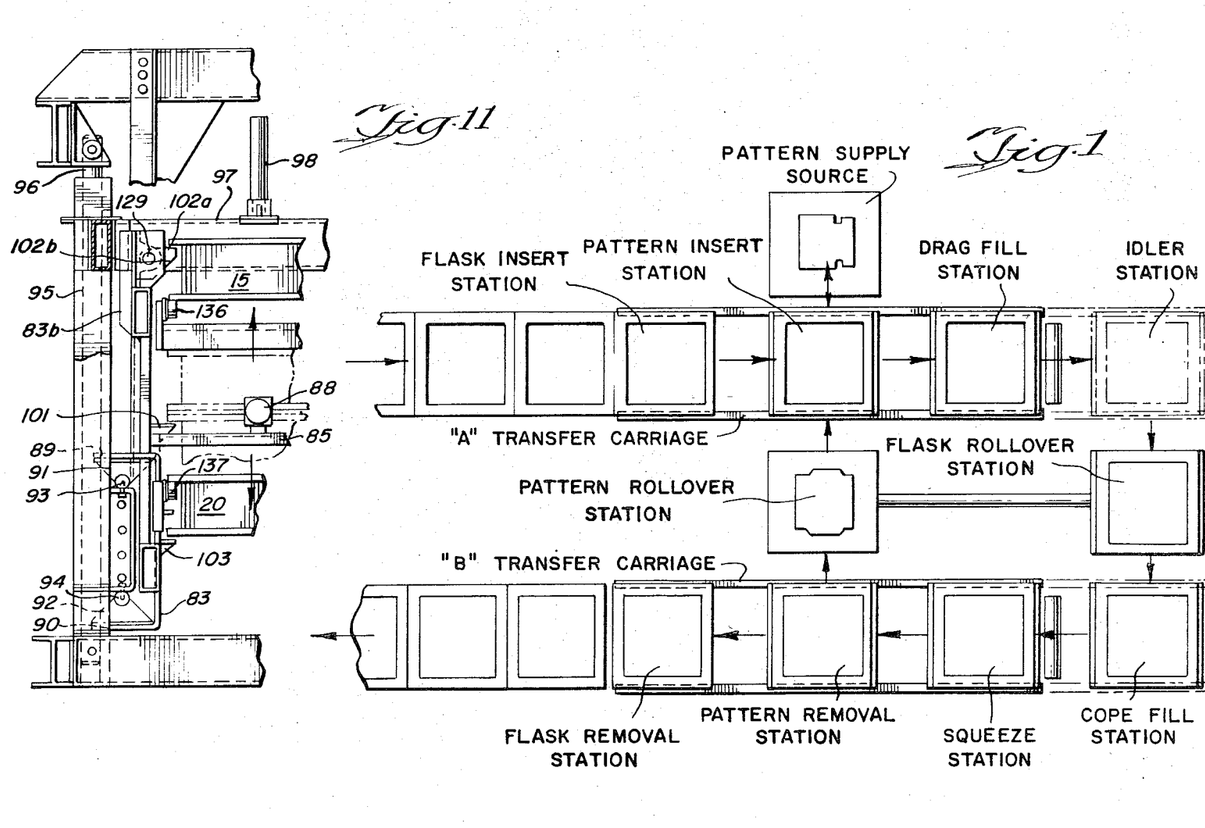
FIG. 1 is a schematic top plan view of a preferred embodiment of the multi-station apparatus of the invention.
FIG. 11 is a fragmentary elevational view taken along line 11—11 of FIG. 7.

FIG. 1 presents a schematic illustration of a preferred embodiment of the multi-station apparatus of the invention in a preferred configuration with arrows indicating the direction of movement of mold flasks and matchplate mold patterns through the apparatus.

Mold flasks having drag sections stacked atop cope sections are supplied by hydraulic means to a first, "A," transfer carriage at the Flask Insert station. Flasks are then individually moved by the carriage to the Pattern Insert station where flask sections are spaced apart to permit positioning of a matchplate mold pattern and thereafter closed together about the pattern. As indicated in the illustration, a pattern for use at the Insert station may derive from either the Pattern Supply Source or the Pattern Rollover station. The transfer carriage then moves the assembled flask and pattern to the Drag Fill station where sand or other suitable mold forming material is deposited in the flask drag section. The Drag Fill station will preferably include mechanical jolt means for compacting the material in the drag section.

The carriage will then move the flask preferably past a pressure roller and strike-off bar to an Idler station where the flask is made available for lateral movement to the Flask Rollover station.

Subsequent to movment by hydraulic means to the Pattern Rollover station, the flask is inverted and thereafter moved by other hydraulic means to the Cope Fill station where the cope section is filled with sand or other suitable mold forming material. A second, "B," transfer carriage then moves the flask, preferably past a pressure roller and strike-off bar, to the Squeeze station. The Squeeze station includes pneumatic and hydraulic squeeze means for compacting the material in both cope and drag sections. The carriage then moves the flask to the Pattern Removal station where the filled flask sections are spaced apart and the pattern is removed by hydraulic means to the Pattern Rollover station for inverting. The filled, spaced apart flask sections are then moved to the Flask Removal station and are thereafter removed from the carriage by hydraulic means to another area for sprue drilling, core setting, closure, pouring and other such operations.

As set forth in greater detail in following portions of the disclosure, the above-described apparatus is adapted to prepare molds in a continuous, mass production operation, with the first and second carriages capable of transferring three flask assemblies at a time, each from a given station to the next succeeding station.

Figure 2:
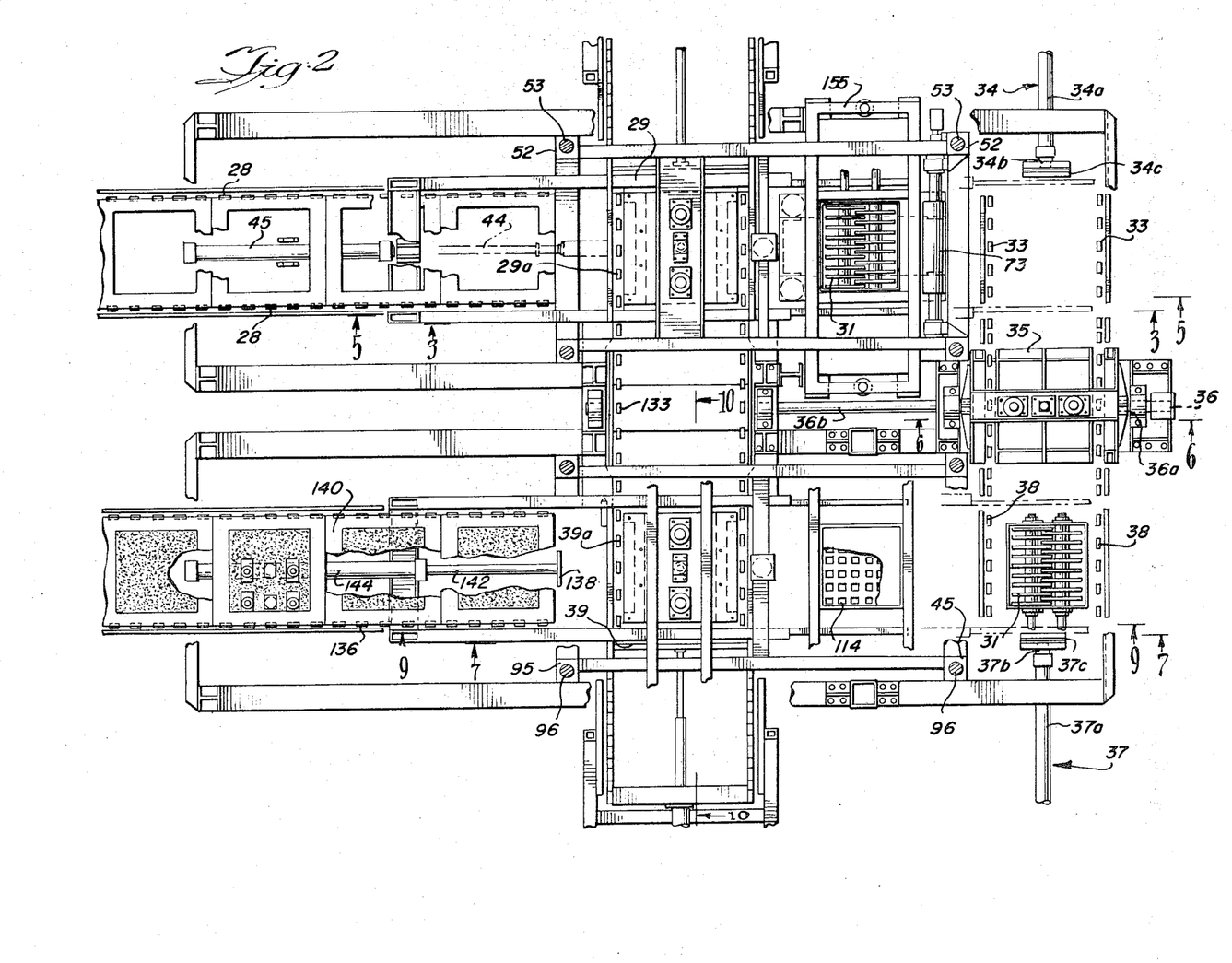
FIG. 2 is a top plan view of an embodiment of the apparatus of the invention in greater detail, with portions of the cope squeeze station and flasks in supply and removal areas cut away.

FIG. 2 illustrates the above-outlined multi-station apparatus in greater detail. In discussion of FIG. 2 it will be helpful to note that, by means which shall be described in detail subsequently, each of the "A" and "B" carriages may be: (1) raised; (2) moved in a first direction (advanced); (3) lowered; and (4) moved in a second direction opposite the first (retracted).

Empty flasks 14, each having drag section 20 stacked atop cope section 15 are positioned in abutting fashion and pushed by selectively engageable hydraulic cylinder means along a double line 28 of supporting rollers. An individual flask is pushed until stopped by contact with shock absorber 60 (FIG. 5) located at the Flask Insert station. The position of a flask as it is stopped at the Flask Insert station is such that it may be picked up by the "A" carriage as the carriage is raised. Once picked up by the carriage, the flask is moved to the Pattern Insert station as the carriage is advanced. At the Pattern Insert station the flask comes to rest as the carriage is lowered prior to retraction.

At the Pattern Insert station the flask sections are spaced apart to allow positioning of a pattern between the sections. If the pattern derives from the Pattern Supply Source, it is positioned by means of a hydraulically extendable yoke 29 adapted to carry in a pattern 25 from the Source. Once the flask sections are closed together about the pattern, yoke 29 is withdrawn. Alternately, the pattern may derive from the Pattern Rollover station and in such case yoke 29 will be empty when extended between the spaced apart sections and will receive and temporarily support the pattern coming from the Pattern Rollover station. Again, once the flask sections are closed together about the pattern, yoke 29 is withdrawn. The position of the flask after cope and drag sections are closed together about the pattern is such that the flask may be picked up by the carriage (since retracted) as it is again raised. Once picked up by the carriage, the flask is moved to the Drag Fill station as the carriage is again advanced. At the Drag Fill station the flask comes to rest as the carriage is lowered prior to retraction.

At the Drag Fill station sand or other mold forming material is deposited in drag section 20. Preferably, the material is impelled from hopper 71 (FIG. 5) by rotating blades 31. Further, the material deposited in drag 20 is preferably compacted by mechanically jolting the flask. The position of the flask upon completion of the operations taking place in the Drag Fill station is such that the flask may be picked up by the carriage (since retracted) as it is once again raised. Once picked up by the carriage, the flask is moved to the Idler station as the carriage is once again advanced. At the Idler station the flask comes to rest on a double line 33 of supporting rollers as the carriage is lowered prior to retraction. In being moved from the Drag Fill station to the Idler station, it is preferable that the flask pass a vertically adjustable pressure roller 73 and vertically adjustable strike-off bar 72 (FIG. 5) which serve to compact the material in drag 20 and level off some of the material which may extend out of the section.

At the Idler station a selectively engagable hydraulic push cylinder means 34 which incudes electromagnetic means for attaching the flask pushes the flask to the Flask Rollover station.

At the Flask Rollover station the flask is releasably secured in frame 35. Motor 36 function to invert frame 35 and the flask secured therein. Selectively engagable hydraulic pull cylinder means 37 then attached to the flask by electromagnetic means and pulls the flask along double line 38 of supporting rollers to the Cope Fill station.

At the Cope Fill station sand or other mold forming material is deposited in cope section 15. Preferably the material is impelled from hopper 108 (FIG. 9) by rotating blades 31. The position of the flask upon completion of the cope filling operation at the Cope Fill station is such that the flask may be picked up by the "B" carriage as it is raised. Once picked up by the carriage, the flask is moved to the Squeeze station as the carriage is advanced. At the Squeeze station the flask comes to rest as the carriage is lowered prior to retraction. In being moved from the Cope Fill station to the Squeeze station, it is preferable that the flask pass a vertically adjustable pressure roller 105 and vertically adjustable strike-off bar 104 (FIG. 9) which serve to compact the material in cope 15 and level off some of the material which may extend out of the section.

At the Squeeze station pneumatic squeeze means, including a plurality of finger-like projections 38, compact the material in cope 15 and hydraulic means further compact the material in drag 20. The position of the flask at the Squeeze station is such that the flask may be picked up by the carriage (since retracted) as it is again raised. Once picked up by the carriage, the flask is moved to the Pattern Removal station as the carriage is again advanced. At the Pattern Removal station the flask comes to rest as the carriage is lowered prior to retraction.

At the Pattern Removal station, hydraulically extendable yoke 39 is extended to support pattern 25. Flask sections are then spaced apart and come to rest on support means provided on the carriage (since retracted). "Piggy-back" push cylinder means 130 (FIG. 10) then pushes pattern 25 out of yoke 39 into the Pattern Rollover station and thereafter both yoke 39 and cylinder means 130 are retracted. Spaced apart cope 15 and drag 20 are moved to the Flask Removal station as the carriage is advanced.

At the Pattern Rollover station, pattern 25 is inverted (simultaneously with the flask inversion which takes place at the Flask Rollover station) in order to prepare pattern 25 for possible re-use at the Pattern Insert station.

At the Flask Removal station, hydraulic pull cylinder means 140, 141 (FIG. 9) pull the spaced apart sections along separate double lines of supporting rollers 136, 137 (FIG. 9) to other areas where further molding operations take place.

Figure 3:
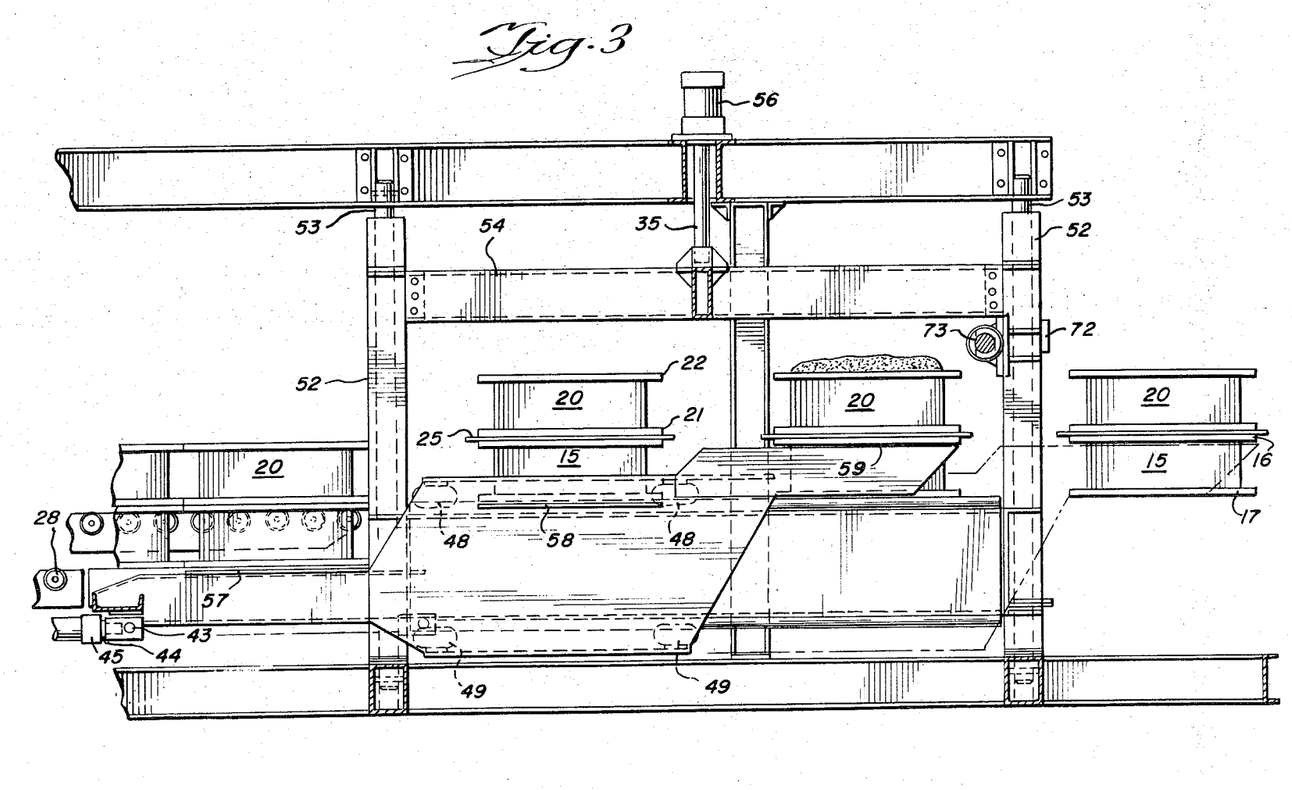
FIG. 3 is an elevational view taken along line 3—3 of FIG. 2.
Figure 4:
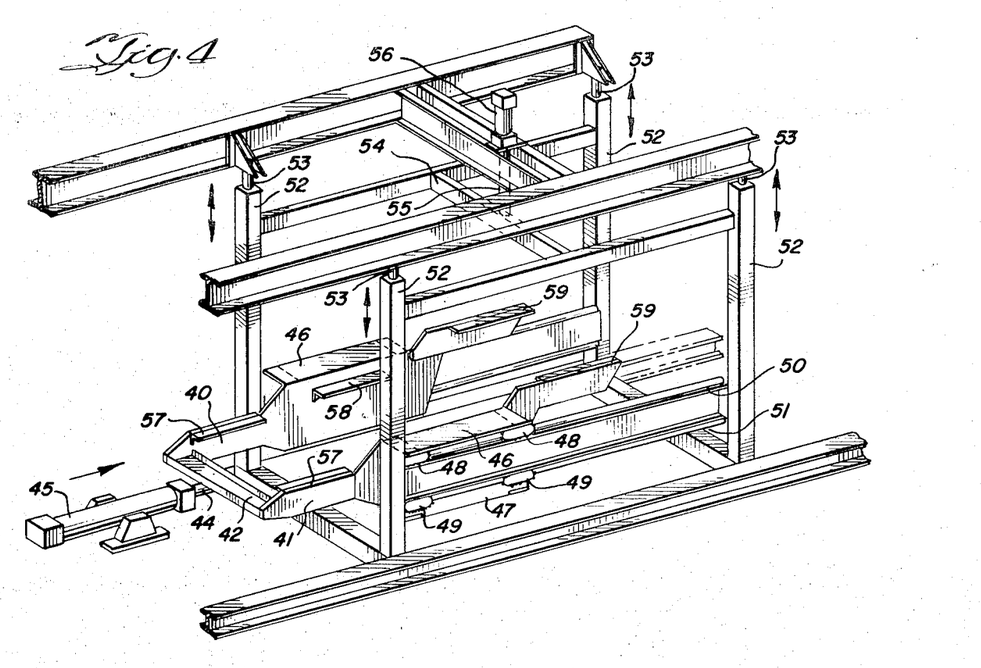
FIG. 4 is a perspective view of a first embodiment of the flask transporting carriage of the invention.

The operation of transfer carriage "A" is best illustrated by reference to the preferred embodiment shown in FIGS. 3 and 4. The carriage is constructed in the form of a yoke having sides 40, 41, extending substantially parallel to each other and joined to transverse bar 42. Bar 42 is pivotally interconnected by trunnion joint means 43 to rod 44 of horizontally aligned hydraulic cylinder 45. Sides 40, 41 are each provided with outwardly extending upper and lower flanges 46 and 47 respectively. Each upper flange 46 is provided with a pair of downwardly oriented "roundway bearings" 48 and each lower flange 47 is provided with a pair of upwardly oriented "roundway bearings" 49. Bearings 48, 49 cooperate respectively with horizontally extending cylindrical "ways" 50, 51, enabling the carriage to be rolled either in a first direction (advanced) or in the opposite direction (retracted) along the "ways" by the forth and back movement of rod 44. "Ways" 50, 51 are rigidly interconnected to beams 52 which are adapted to slide up and down along rods 53. Beams 52 are rigidly interconnected to H-frame 54 which is in turn rigidly interconnected to rod 55 of vertically aligned hydraulic cylinder 56. Upward and downward movement of rod 55 will result in raising and lowering of the carriage due to the interconnection and/or cooperation of H-frame 54, beams 52, "ways" 50, 51, "roundway bearings" 48, 49, and carriage flanges 46, 47.

Thus, by means above-described, the carriage may in sequence be: (1) raised; (2) moved in a first direction (advanced); (3) lowered; and (4) moved in a direction opposite the first (retracted).

Carriage sides 40, 41 are further provided with three sets of complimentary, inwardly extending lug means, 57, 58, 59, each set being capable of supporting a mold flask along appropriate flask flanges.

Operation of the "A" carriage is best exemplified by the following recitation of how a first, second, third and fourth flask enter the apparatus and are affected by the sequential movements of the carriage. For clarifying purposes, operations upon flasks at the individual stations are set forth in parenthesis.

BACKGROUND

First, second, third and fourth flasks, having drag 20 stacked atop cope 15, are aligned in abutting fashion, supported on inner cope flange 17 along double line of rollers 28, with the first flask positioned at the Flask Insert station.

First Carriage Sequence

1. Carriage Raised
First flask lifted by carriage lugs 57 contacting flask outer cope flange 17.
2. Carriage Advanced
First flask moved to Pattern Insert station.
(Second flask indexed to Flask Insert station.)
3. Carriage Lowered First flask lowered to rest at Pattern Insert station.
4. Carriage Retracted
(First flask undergoes pattern inserting operations at the Pattern Insert station with the flask finally supported at horizontal level above original level upon entering Pattern Insert station.)

Second Sequence

1. Carriage Raised
First flask lifted by carriage lugs 58 contacting flask outer cope flange 17.
Second flask lifted by carriage lugs 57 contacting flask outer cope flange 17.
2. Carriage Advanced
First flask moved to Drag Fill station.
Second flask moved to Pattern Insert station.
(Third flask indexed to Flask Insert station.)
3. Carriage Lowered
First flask lowered to rest at Drag Fill station.
Second flask lowered to rest at Pattern Insert station.
4. Carriage Retracted
(First flask undergoes drag filling and compacting operations at the Drag Fill station.)
(Second flask undergoes pattern inserting operations at the Pattern Insert station with the flask finally supported at horizontal level above original level upon entering Pattern Insert station.)

Third Sequence

1. Carriage Raised
First flask lifted by carriage lugs 59 contacting inner cope flange 16.
Second flask lifted by carriage lugs 58 contacting outer cope flange 17.
Third flask lifted by carriage lugs 57 contacting outer cope flange 17.
2. Carriage Advanced
First flask moved past pressure roller 73 and strike-off bar 72 to Idler station.
Second flask moved to Drag Fill station.
Third flask moved to Pattern Insert station.
(Fourth flask indexed to Flask Insert station.)
3. Carriage Lowered
First flask lowered to rest on double line 33 of rollers at Idler station which support outer cope flange 17.
Second flask lowered to rest at Drag Fill station.
Third flask lowered to rest at Pattern Insert station.
4. Carriage Retracted
(First flask pushed to Flask Rollover station.)
(Second flask undergoes drag filling and compacting operations at the Drag Fill station.)
(Third flask undergoes pattern inserting operations at the Pattern Insert station with flask finally supported at horizontal level above original level upon entering Pattern Insert station.)

Figure 5:
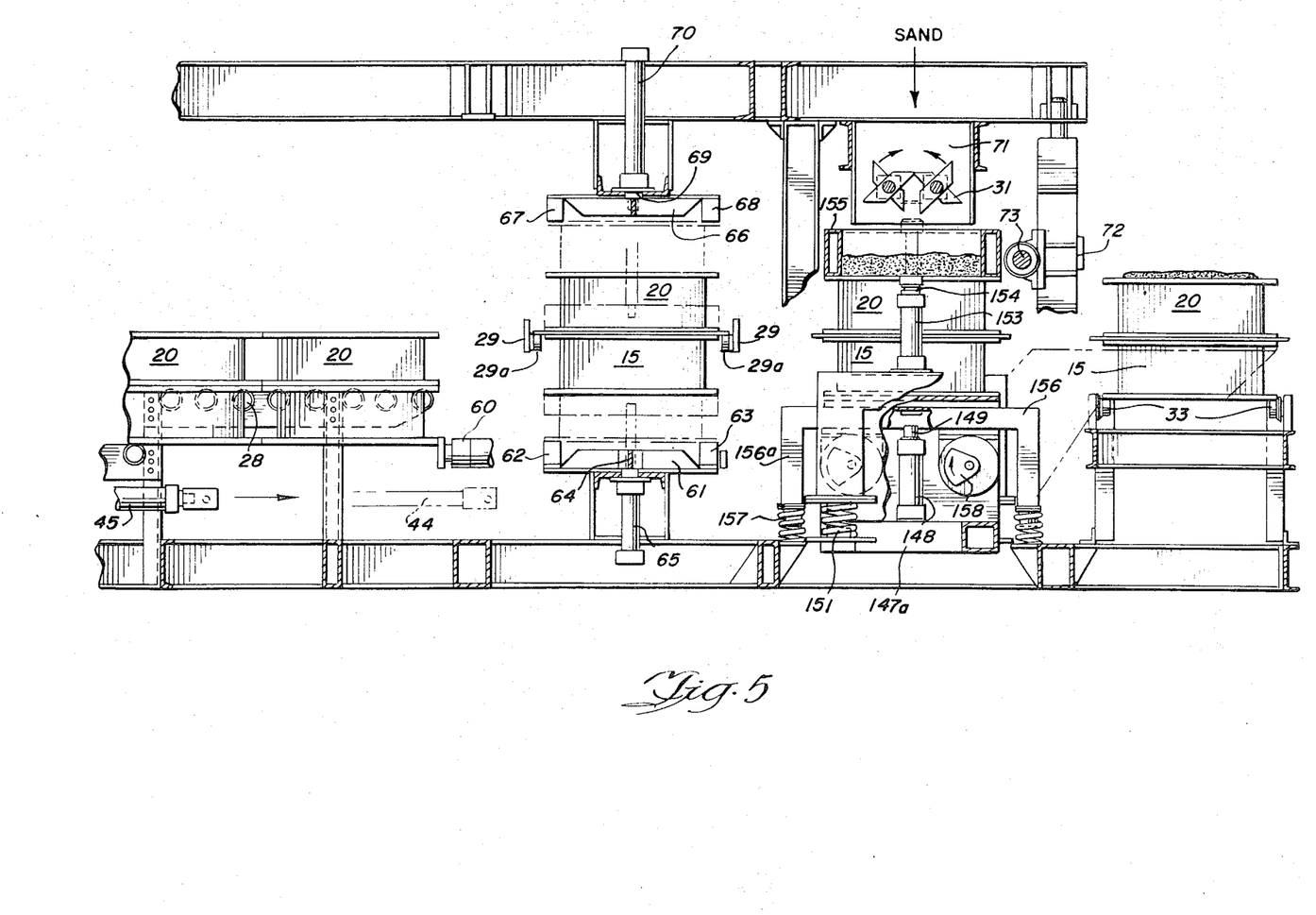
FIG. 5 is an elevational view taken along line 5—5 of FIG. 2.

FIG. 5 illustrates the apparatus of the Flask Insert, Pattern Insert and Drag Fill stations in greater detail.

As previously described, flasks 14 with drag 20 sections stacked atop cope 15 sections are indexed toward the Flask Insert station along double line 28 of rollers. A given flask will stop in the Flask Insert station upon contacting shock absorber 60.

A flask at the Flask Insert station is lifted by "A" carriage lugs 57 contacting outer cope flange 17, is moved to the Pattern Insert station and is lowered to rest with outer cope flange 17 supported by lower platen 61. The initial horizontal level of the flask as it is supported on platen 61 is substantially the same as the horizontal level of the flask at the Flask Insert station.

Lower platen 61 is provided with selectively engageable electromagnetic means 62, 63 which function to releasably secure outer cope flange 17 to platen 61. Further, platen 61 is rigidly connected to rod 64 of vertically aligned cylinder 65.

In substantially aligned position above lower platen 61 is upper platen 66. Platen 66 is provided with selectively engageable electromagnetic means 67, 68 for releasably securing outer drag flange 22 to platen 66 and is further rigidly connected to rod 69 of vertically aligned cylinder 70.

As a flask is lowered to rest on lower platen 61, electromagnetic means 62, 63 are engaged to secure outer cope flange 17, and thus cope 15, to platen 61. Rod 69 is then extended downward from cylinder 70, bringing upper platen 66 into contact with outer drag flange 22. Electromagnetic means 67, 68 are engaged to secure outer drag flange 22, and thus drag 20, to platen 66. Rod 69 is then retracted, raising platen 66 and thereby spacing apart drag 20 from cope 15 to permit positioning of pattern 25 therebetween.

Yoke 29 is then extended. As mentioned previously, if the pattern for insertion between cope 15 and drag 20 is to derive from the Pattern Supply Source, it will be carried in by yoke 29 on rollers 29a. If, however, the pattern is to derive from the Pattern Rollover station, yoke 29 will be empty when extended, but will receive the pattern on rollers 29a as the pattern is moved from the Pattern Rollover station.

With pattern 25 in position on yoke 29 between cope 15 and drag 20, rod 64 is extended from cylinder 65, raising platen 61 and cope 15 secured thereto until inner cope flange 16 contacts pattern 25. At the same time, rod 69 is extended from cylinder 70, lowering platen 66 and drag 20 secured thereto until inner drag flange 21 contacts pattern 25. Electromagnetic means 62, 63 and 67, 68 are disengaged and rod 69 is retracted, raising platen 66 away from drag 20. Yoke 29 is retracted. As a result of the above operations, pattern 25 is positioned between cope 15 and drag 20 and flask 14 rests on platen 61 at a horizontal level above the horizontal level which it had at the Pattern Insert station. Such change in horizontal level permits flask 14 to be lifted by carriage lugs 58 on the "A" carriage.

A flask with pattern inserted at the Pattern Insert station is lifted by the "A" carriage lugs 58 contacting outer cope flange 17, moved to the Drag Fill station and lowered to rest on platen 146. Sand or other suitable mold forming material is released from hopper 71 for deposit in drag 20, preferably being impelled into drag 20 by means of rotating blades 31. Operation of the mechanical jolt mechanism may take place at this time. Detailed discussion of the method of operation of the jolt is presented subsequently. The horizontal level of flask 14 at the Drag Fill station is such that flask 14 may be lifted by carriage lugs 59 contacting inner cope flange 16 as the "A" carriage (since retracted) is raised.

A flask with drag 20 filled at the Drag Fill station is lifted by the "A" carriage lugs 59, moved to the Idler station and lowered to rest with outer cope flange 17 supported on double line 33 of rollers. In being transferred from Pattern Insert station to Idler station, it is preferable that the flask pass pressure roller 73 which functions to compact the material in drag 20. Further the flask may preferably pass strike-off bar 72, which functions to level off some of the sand or like material which may extend out of drag 20 after drag filling operations.

The Idler station is so named because none of the critical functions of mold preparation are performed at the station. Rather, the function of the station is to provide for lateral movement of the flask to the Flask Rollover station. This is accomplished through use of hydraulic cylinder means 34 comprising cylinder 34a, rod 34b and selectively engageable electromagnetic means 34c on rod 34b (FIG. 2).

Once the "A" carriage is retracted following lowering of flask 14 onto double line 33 of rollers, electromagnetic means 34c are engaged and rod 34b is extended to contact the flask. Electromagnetic means 34c secure the flask to rod 34b. Rod 34b is further extended to push the flask into the Flask Rollover station. Electromagnetic means 34c are thereafter disengaged, releasing the flask from secured contact with rod 34b and rod 34b is retracted (in time to permit the "A" carriage to advance another flask to the Idler station).

Figure 6:
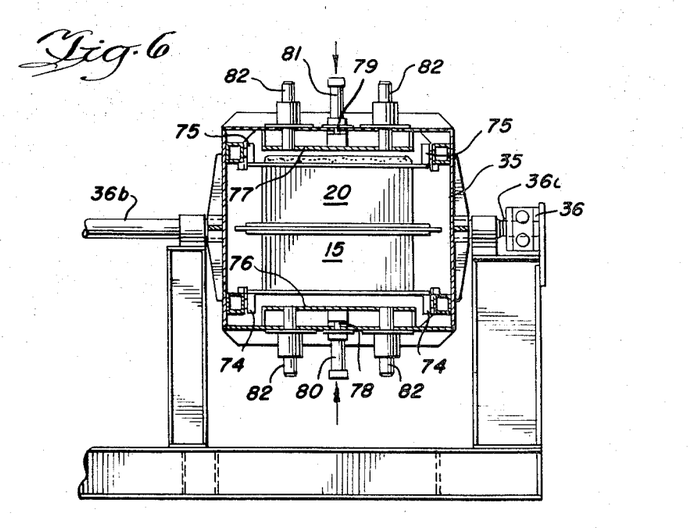
FIG. 6 is an elevational view taken along line 6—6 of FIG. 2.

Operation of the Flask Rollover station is best understood with reference to FIG. 6. The flask rollover apparatus comprises frame 35 connected by shaft 36a to motor 36. Frame 35 is fitted with two double lines 74, 75 of rollers and two platens 76, 77, each platen respectively connected to rods 78, 79 of cylinders 80, 81. Preferably included are platen guide means 82.

In use, a flask 14 will be pushed into frame 35 from the Idler station and supported by double line 74 of rollers contacting outer cope flange 17. The spaced relationship of the two double lines of rollers is such that with double line 74 of rollers supporting outer cope flange 17, double line 75 of rollers is closely adjacent outer drag flange 22. Cylinders 80, 81 extend rods 78, 79, securing flask 14 between platens 76, 77. Motor 36 is then actuated, turning shaft 36a and rotating frame 35 through 180° and inverting flask 14. Rods 78, 79 are thereafter retracted moving platens 76, 77 out of contact with flask 14. It will be appreciated that, after inversion, flask 14 has empty cope 15 stacked atop filled drag 20, with flask 14 being supported by double line 75 of rollers contacting outer drag flange 22. It will also be appreciated that contact of platen 77 with flask 14 may serve to further compact mold forming material in drag 20.

Flask 14 is transferred from the Flask Rollover station to the Cope Fill station by hydraulic cylinder means 37 comprising cylinder 37a, rod 37b and selectively engageable electromagnetic means 37c (FIG. 2).

Once flask 14 has been inverted, electromagnetic means 37c are engaged and rod 37b is extended to contact the flask, electromagnetic means 37c functioning to secure the flask to rod 37b. Rod 37b is then retracted to pull the flask into the Cope Fill station along double line 38 of rollers. Electromagnetic means 37c are thereafter disengaged, releasing the flask, and rod 37b is further retracted.

Once a flask has progressed to the Cope Fill station, its further movements are substantially affected by the operation of the "B" carriage. It is therefore appropriate to presently consider the construction and operation of that carriage in reference to FIGS. 7 and 8.

Figure 7:
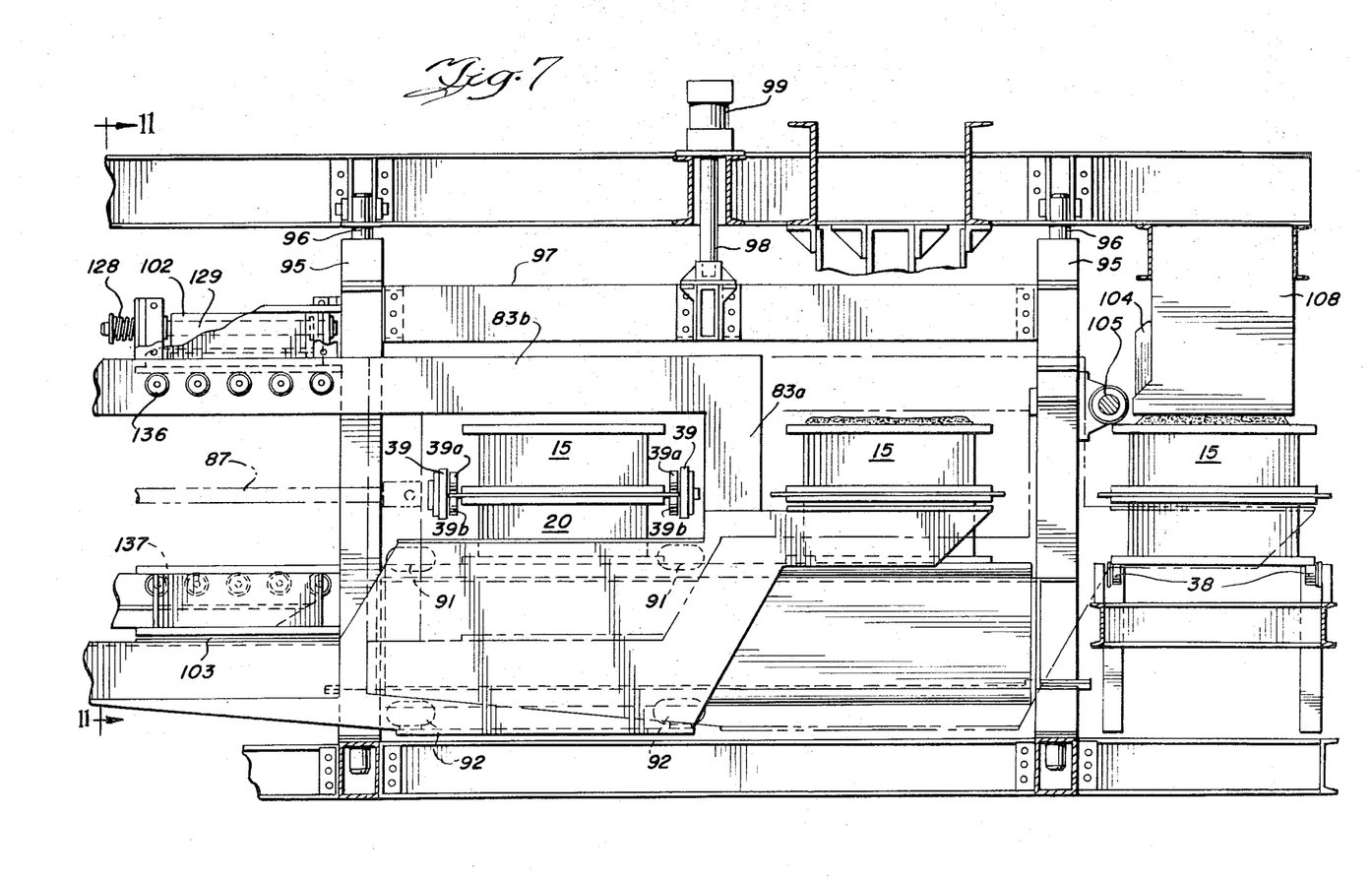
FIG. 7 is an elevational view taken along line 7—7 of FIG. 2.
Figure 8:
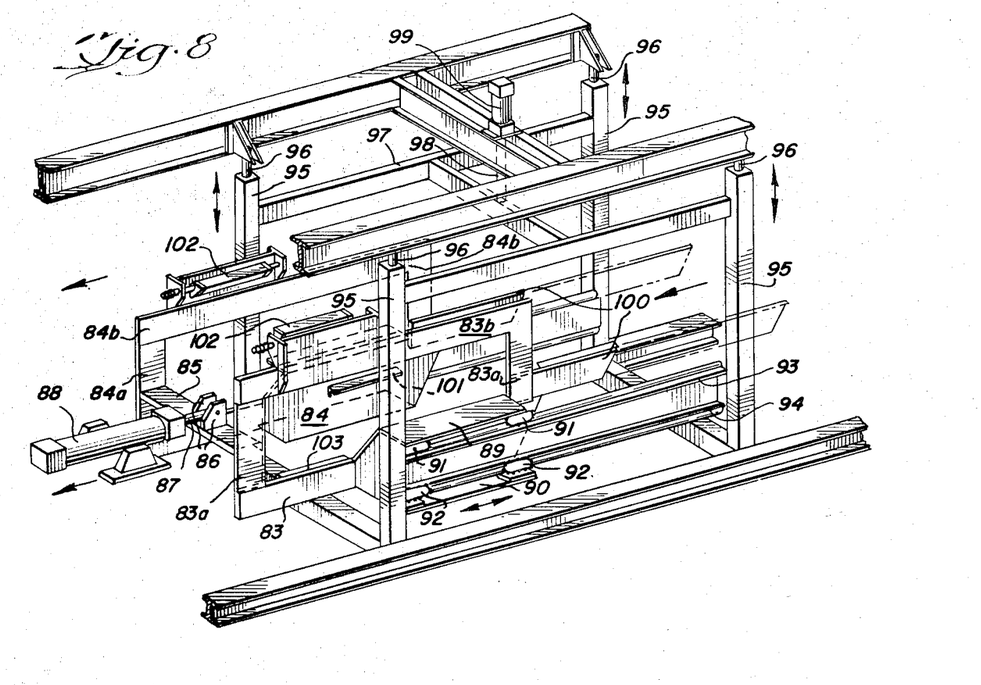
FIG. 8 is a perspective view of a second embodiment of the flask transporting carriage of the invention.

The carriage is constructed in the form of a yoke, having sides 83, 84, extending substantially parallel to each other and joined to transverse bar 85. It may be noted that sides 83, 84 of the "B" carriage are substantially similar to sides 40, 41 of the "A" carriage, differing only in that sides 83, 84 include paired vertically extending members, 83a, 84a and horizontally extending members 83b, 84b. Bar 85 is pivotally interconnected by trunnion joint means 86 to rod 87 of horizontally aligned hydraulic cylinder 88. Sides 83, 84 are each provided with outwardly extending upper and lower flanges 89, 90. Each upper flange 89 is provided with a pair of downwardly oriented "roundway bearings" 91 and each lower flange 90 is provided with a pair of upwardly extending "roundway bearings" 92. Bearings 91, 92 cooperate respectively with horizontally extending cylindrical "ways" 93 94, enabling the carriage to be rolled either in a first direction (advanced) or in the opposite direction (retracted) along the "ways" by the forth and back movement of rod 87. "Ways" 93, 94 are rigidly interconnected with beams 95 which are adapted to slide up and down along rods 96. Beams 95 are rigidly interconnected to H-frame 97 which is in turn rigidly interconnected to rod 98 of vertically aligned hydraulic cylinder 99. Upward and downward movement of rod 98 will result in raising and lowering of the carriage due to the interconnection and/or cooperation of H-frame 97, beams 95, "ways" 93, 94, "roundway bearings" 91, 92, and carriage flanges 89, 90.

Thus, by means above described, the carriage may in sequence be: (1) raised; (2) moved in a first direction (advanced); (3) lowered; and (4) moved in a direction opposite the first (retracted).

Carriage sides 83, 84 are further provided with four sets of complimentary, inwardly extending lugs, 100, 101, 102, 103, each set being capable of supporting a mold flask or, as need be, a mold flask section along appropriate flask flanges. Lugs 102 are of a "snap-lock" variety allowing for a specialized function discussed in detail subsequently.

Operation of the "B" carriage is best exemplified by the following recitation of how a first, second, third and fourth flask are affected by the sequential movements of the carriage. For clarifying purposes, operations upon flasks by the "A" carriage and operations at individual stations are set forth in parenthesis.

BACKGROUND

The four flasks are in the following positions immediately prior to the start of the first sequence of the "B" carriage: the first flask is at the Cope Fill station; the second flask is secured at the Flask Rollover station; the third flask is in transit on the "A" carriage from the Drag Fill station to the Idler station; and the fourth flask is in transit on the "A" carriage from the Pattern Insert station to the Drag Fill station.

First Carriage Sequence

1. Carriage Raised
  First flask lifted by carriage lugs 100 contacting inner drag flange 21.
  (Second flask inverted at Flask Rollover station.)
  (Third flask lowered to rest at the Idler station.)
  (Fourth flask lowered to rest at the Drag Fill station.).
2. Carriage Advanced
  First flask moved to Cope Squeeze station, preferably past pressure roller 105 and strike-off bar 104.

(Second flask contacted by electromagnetic means 37c of extending rod 37b.)
(Third flask contacted by electromagnetic means 34c of extending rod 34b.)
(Fourth flask undergoes filling and compacting operations at Drag Fill station.)
3. Carriage Lowered
First flask lowered to rest at Squeeze station.
(Second flask pulled to Cope Fill station.)
(Third flask pushed to Flask Rollover station.)
(Fourth flask lifted by "A" carriage.)
4. Carriage retracted
(First flask undergoes compacting operations at Cope Squeeze station.)
(Second flask undergoes filling operations at Cope Fill station.)
(Third flask secured at Flask Rollover station.)
(Fourth flask moved on "A" carriage from Drag Fill station to Idler station.)

Second Carriage Sequence

1. First flask lifted by carriage lugs 101 contacting outer drag flange 22.
Second flask lifted by carriage lugs 100 contacting inner drag flange 21.
(Third flask inverted at Flask Rollover station.)
(Fourth flask lowered to rest at Idler station.)
2. Carriage Advanced
First flask moved to Pattern Removal station.
Second flask moved to Cope Squeeze station, preferably past pressure roller 105 and strike-off bar 104.
(Third flask contacted by electromagnetic means 37c of extending rod 37b.)
(Fourth flask contacted by electromagnetic means 34c of extending rod 34b.)
3. Carriage Lowered
First flask lowered to rest at the Pattern Removal station.
Second flask lowered to rest at the Squeeze station.
(Third flask pulled to Cope Fill station.)
(Fourth flask pushed to Flask Rollover station.)
4. Carriage Retracted
(First flask undergoes pattern removal operations at Pattern Removal station, with cope 15 raised to rest with inner cope flange 16 on carriage lugs 102 and drag 20 lowered to rest with outer drag flange 22 on carriage lugs 103.
(Second flask undergoes compacting operation at Squeeze station.)
(Third flask undergoes filling operation at Cope Fill station.)
(Fourth flask is secured at Flask Rollover station.)

Third Carriage Sequence

1. Carriage Raised
Cope 15 and drag 20 of first flask raised with carriage.
Second flask lifted by carriage lugs 101 contacting outer drag flange 22.
Third flask lifted by carriage lugs 100 contacting inner drag flange 21.
(Fourth flask inverted at Flask Rollover station.)
2. Carriage Advanced
Cope 15 and drag 20 of first flask moved to Flask Removal station.
Second flask moved to Pattern Removal station.
Third flask moved to Squeeze station.
(Fourth flask contacted by electromagnetic means 37c on extending rod 37b.)
3. Carriage Lowered
Cope 15 and drag 20 of first flask lowered to rest at Flask Removal station.
Second flask lowered to rest at Pattern Removal station.
Third flask lowered to rest at Cope Squeeze station.
(Fourth flask pulled to Cope Fill station.)
4. Carriage Retracted
(Cope 15 and drag 20 of first flask removed by hydraulic cylinder means 140 and 141 (FIG. 9) respectively.)
(Second flask undergoes pattern removal operation at Pattern Removal station with cope 15 of second flask raised to rest with inner cope flange 16 on carriage lugs 102 and drag 20 of second flask lowered to rest with outer drag flange 22 on carriage lugs 103.)
(Third flask undergoes compacting operation at Squeeze station.)
(Fourth flask undergoes filling operation at Cope Fill station.)

Figure 9:
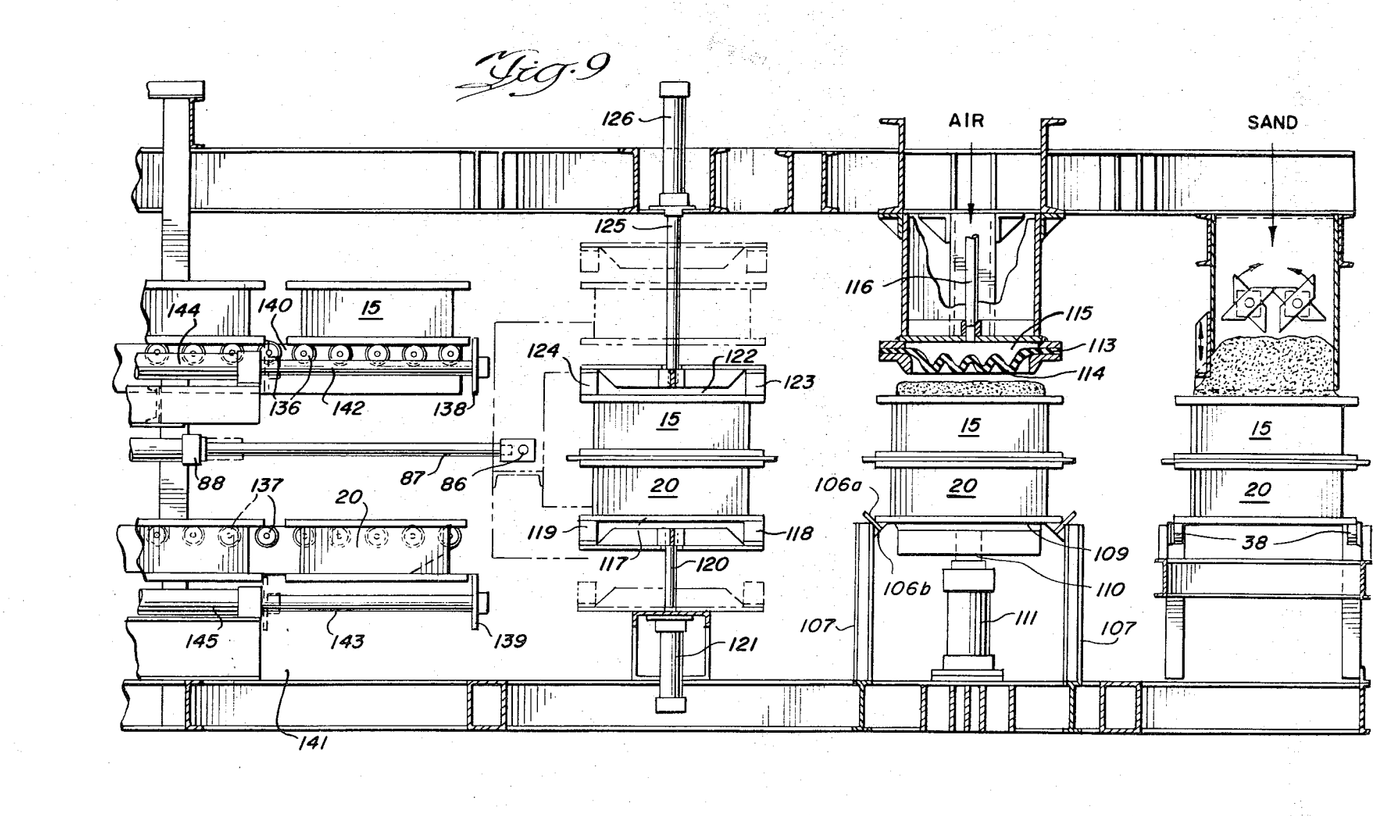
FIG. 9 is an elevational view taken along line 9—9 of FIG. 2.
Figure 10:
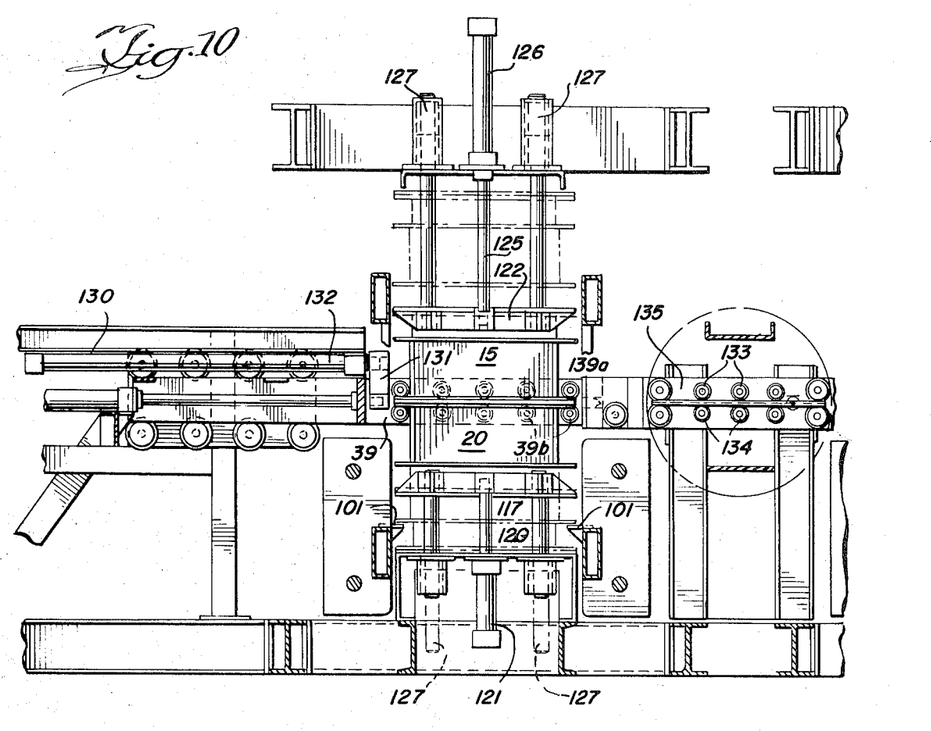
FIG. 10 is an elevational view taken along line 10—10 of FIG. 2.

FIGS. 9, 10 and 11 illustrate the apparatus of the Cope Fill, Squeeze, Pattern Removal, Flask Removal, and Pattern Rollover stations in greater detail.

A flask 14 is positioned at the Cope Fill station having cope 15 empty and drag 20 filled with mold forming material. Flask 14 rests at the station with outer drag flange 22 supported on double line 38 of rollers. Sand or other mold forming material is released from hopper 108 for deposit in cope 15, preferably being impelled by rotating blades 31.

With cope 15 filled, flask 14 is lifted by "B" carriage lugs 100 contacting inner drag flange 21 as the carriage is raised. Once picked up by the carriage, flask 14 is moved, preferably past strike-off bar 104 and pressure roller 105 to the Squeeze station and there lowered to rest above platen 109 with outer drag flange 22 centerd by tapering guide members 106a for support on lugs 106b of vertical support members 107. The carriage thereafter is retracted.

Platen 109 is rigidly connected to rod 110 of vertically aligned cylinder 111. In spaced relation above platen 109 is pneumatic squeeze means 112 comprising resilient flexible diaphragm 113 having fingerlike projections 114, chamber 115 and air supply conduit 116. Rod 110 is extended, compressively contacting platen 109 with the material in drag 20 and lifting flask 14 upward until the material in cope 15 is brought into compressive contact with fingerlike projections 114 of diaphragm 113, thus compacting the material in both cope 15 and drag 20. Air under pressure is then introduced into chamber 115 through conduit 116 causing projections 114 to extend still further into the material in cope 15 as diaphragm 113 is stretched or "ballooned" downward by the air. Thereafter the air is exhausted from chamber 115 and resilient flexible diaphragm 113 returns to its original unstretched position. Rod 110 is retracted, lowering flask 14 from squeeze means 112.

After the squeeze operation, the position of flask 14 is such that the flask may be picked up on outer drag flange 22 by lugs 101 of the carriage (since retracted) as it is again raised. Once picked up by the carriage, flask 14 is moved to the Pattern Removal station and lowered to be supported on lower platen 117. The carriage is thereafter retracted.

Lower platen 117 is provided with selectively engageable electromagnetic means 118, 119 which function to releasably secure outer drag flange 22 to platen 117. Further, platen 117 is rigidly interconnected to rod 120 of vertically aligned hydraulic cylinder 121.

In substantially aligned position above lower platen 117 is upper platen 122. Platen 122 is provided with selectively engageable electromagnetic means 123, 124 for releasably securing cope outer flange 17 to platen 122 and is further rigidly interconnected to rod 125 of vertically aligned hydraulic cylinder 126. Either or both platens 117, 122 may be provided with platen guide means 127.

As a flask 14 is lowered to rest on platen 117, electromagnetic means 118, 119 are engaged to secure outer drag flange 22 and thus drag 20, to platen 117. Rod 125 is then extended downward from cylinder 126, bringing upper platen 122 into contact with outer cope flange 17. Electromagnetic means 123, 124 are engaged to secure outer cope flange 17, and thus cope 15, to platen 122.

Yoke 39, comprising upper double line 39a of rollers and lower double line 39b of rollers, is advanced to support and secure pattern 25 along its edges. With pattern 25 thus secured in yoke 39, rods 120, 125 are retracted, lowering drag 20 and raising cope 15. (At the time of the above raising and lowering operations the "B" carriage has been retracted.) Drag 20 is lowered to rest with carriage lugs 103 supporting outer drag flange 22. Cope 15 is raised until outer cope flange 17 is supported on carriage snap-lock lugs 102.

Snap-lock lugs 102 include rounded sides 102a and planar sides 102b. Further, lugs 102 are interconnected to spring means 128 and are adapted to rotate through approximately 90° about shaft 129. As cope 15 is raised, outer cope flange 17 contacts rounded sides 102a causing lugs 102 to rotate about shaft 129. Immediately upon cope flange 17 clearing past rotated lugs 102, spring means 128 "snap" lugs 102 down to their original posotion, providing planar sides 102 for support of the flange. Once cope 15 and drag 20 are in position for support on lugs 102, 103 respectively, electromagnetic means 118, 119, 123, 124 are disengaged.

"Piggy-back" push cylinder means 130 comprising head 131 affixed to rod 132 of a horizontally aligned hydraulic cylinder (not shown) will function to remove pattern 25 from yoke 39. With pattern 25 supported and secured in yoke 39 and with cope 15 and drag 20 respectively raised and lowered, rod 132 is extended so that head 131 contacts pattern 25 and rolls it into the Pattern Rollover station. At the Pattern Rollover station, pattern 25 is supported and secured between first and second double lines 133, 134 of rollers along frame 135. With pattern 25 thus secured, actuation of motor 36 will rotate shaft 36b attached to flask frame 35 and rotate frame 135 through 180°, inverting pattern 25.

It should be appreciated that if a first pattern is supported in frame 135 at the Pattern Rollover station at the time a second pattern is moved in from the Pattern Removal station, the first pattern will be displaced, rolling out of frame 135 onto extended yoke 29 at the Pattern Insert station.

Cope 15, supported on outer cope flange 17 by carriage lugs 102, and drag 20, supported on outer drag flange 22 by carriage lugs 103, will rise with the carriage as it is raised. As the carriage is advanced, cope 15 and drag 20 will move to the Flask Removal station.

Since cope 15 and drag 20 are advanced on the carriage in raised position each section will clear the heads 138, 139 of hydraulic pull cylinder means 140, 141. As the carriage is lowered, cope 15 is lowered to rest with inner cope flange 16 supported on double line 136 of rollers and drag 20 is lowered to rest with inner drag flange 21 on double line 137 of rollers. As rods 142, 143 retract into cylinders 144, 145 of hydraulic pull cylinder means 140, 141, head 138 contacts inner cope flange 16, pulling cope 15 from the Flask Removal station and similarly, head 139 contacts outer drag flange 22 pulling drag 20 from the Flask Removal station.

Figure 12:
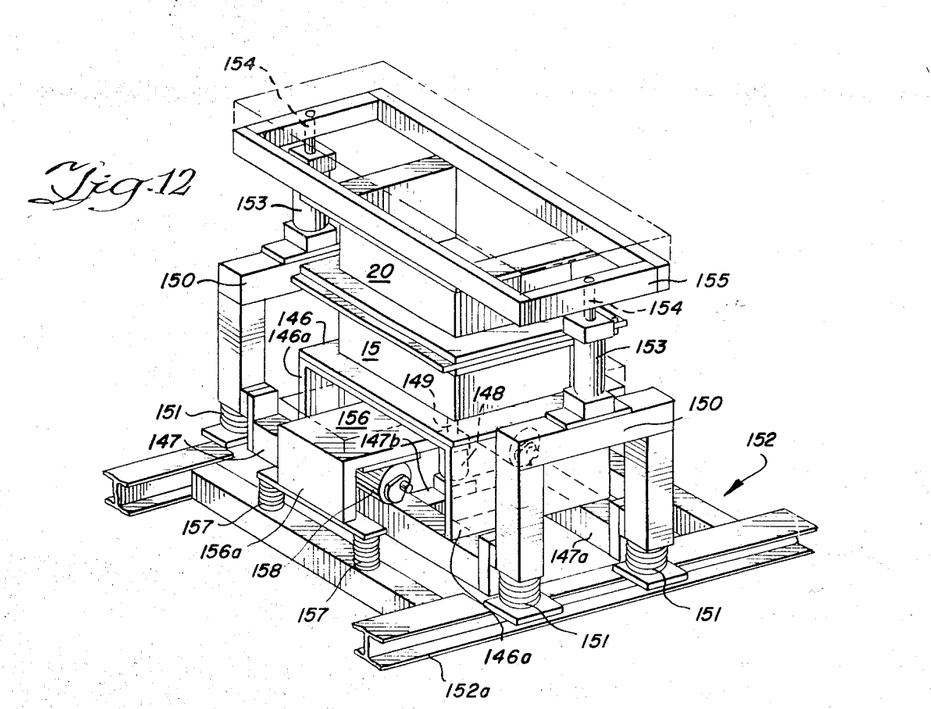
FIG. 12 is a perspective view of an embodiment of the jolt apparatus of the invention.

The mechanical jolt apparatus of the invention which is preferably employed at the Drag Fill station is illustrated in detail in FIGS. 5 and 12. A flask 14, moved to the Drag Fill station by the "A" carriage, will be lowered to rest with outer cope flange 17 supported on platen 146. Platen 146 has downwardly extending supportive members 146a which are rigidly attached to side beams 147a of H-frame 147. Rigidly attached to cross beam 147b of H-frame 147 is vertically aligned hydraulic cylinder 148 having rod 149.

Side beams 147a of H-frame 147 are each rigidly attached to inverted U-frames 150. U-frames 150 are resiliently mounted on spring means 151 attached to side beams 152a of base frame 152. Mounted on each of U-frames 150 is a vertically aligned cylinder 153 having a rod 154. Rigidly attached to rods 154 is rectangular flask clamping frame 155.

In spaced relation below platen 146 is platen 156. Platen 156 has downwardly extending supportive members 156a which are resiliently mounted on spring means 157 attached to cross beams 152b of base frame 152. Affixed to the underside of platen 156 are a pair of double shaft contra-rotating motors 158.

In operation, a flask 14 is lowered to rest with outer cope flange 17 on platen 146. Rods 154 are retracted by cylinders 153, lowering flask clamping frame 155 into contact with outer drag flange 22, thus releasably securing flask 14 to platen 146. It should be noted that the open rectangular construction of flask clamping frame 155 permits deposit of sand or other mold forming material in drag 20 from hopper 71.

Meanwhile, double shaft contra-rotating motors 158 are continuously in operation, imparting a continuous vertical reciprocating motion to resiliently mounted platen 156. With flask 14 secured to platen 146, rod 149 is extended from cylinder 150, contacting platen 156 and moving platen 156 into contact with platen 146. Thus, the continuous vertical reciprocating motion of platen 156 is selectively imparted to platen 146 and flask 14 is secured thereto. The reciprocating motion thus supplied to flask 14 serves to jolt and compact material in drag 20 about pattern 25.

After sufficient jolting, rod 149 is retracted, allowing platen 156 to move downwardly and away from contact with platen 146. Rods 154 are thereafter extended, raising clamping frame 155 from contact with outer drag flange 22, and thus releasing flask 14 from secured position on platen 146. Flask 14 is thus freed for transfer by the "A" carriage to the Idler station.

The method of the invention, as well as the coordinated operation of the apparatus of the invention, will be best understood through consideration of the following outline which sets forth in considerable detail a preferred order of operations at each station.

Station and Carriage Operation Sequences

I. Flask Insert Station
  A. Idle Condition
    1. "A" transfer carriage in retracted position.
    2. Row of flasks 14 having drags 20 stacked atop copes 15 resting on double line 28 of rollers.
    3. Indexing cylinder rod (not shown) in retracted position.
  B. Sequence
    1. Indexing cylinder rod extended, advancing row of flasks 14 toward Pattern Insert station.
    2. Flasks stopped by contact of first flask with shock absorber 60.
    3. Indexing rod retracted.
    4. "A" carriage picks up flask 14 immediately adjacent shock absorber 60 and advances the flask to the Pattern Insert station.
    5. Sequence repeats.

II. Pattern Insert Station
  A. Idle Condition
    1. "A" transfer carriage in retracted position.
    2. Lower platen 61 down (rod 64 retracted).
    3. Electromagnetic means 62, 63 disengaged.
    4. Upper platen 66 up (rod 69 retracted).
    5. Electromagnetic means 67, 68 disengaged.
    6. Yoke 29 at rest at Pattern Supply Source.
  B. Sequence
    1. Flask 14 at Flask Insert station picked up by "A" carriage, moved to Pattern Insert station and lowered to platen 61.
    2. Electromagnetic means 62, 63 engaged, securing cope 15 to platen 61 by outer cope flange 17.
    3. Rod 69 extended, lowering platen 66 to contact with outer drag flange 22.
    4. Electromagnetic means 67, 68 engaged, securing drag 20 to platen 66 by outer drag flange 22.
    5. Rod 69 retracted, raising drag 20.
    6. Yoke 29 bearing pattern 25 extended between spaced apart cope 15 and drag 20. (Note: (1) If there is a pattern in the Pattern Rollover station at this time and it is desired to re-use that pattern for mold preparation, yoke 29 will be extended empty and will receive the pattern from the Pattern Rollover station. (2) If there is a pattern in the Pattern Rollover station at this time and it is desired substitute another pattern for mold preparation, yoke 29 will be extended empty and will receive the pattern from the Pattern Rollover station. Thereafter, the apparatus at all stations will be temporarily halted. Yoke 29 will be retracted and a different pattern will be manually substituted for that one on the yoke. The yoke will then be extended and all station operations will be resumed.)
    7. Rod 64 extended, raising cope 15 into contact with pattern 25.
    8. Rod 69 extended, lowering drag 20 into contact with pattern 25.
    9. Yoke 29 retracted.
    10. Electromagnetic means 67, 68 disengaged, releasing drag 20.
    11. Rod 69 retracted, raising platen 66.
    12. Electromagnetic means 62, 63 disengaged.
    13. "A" carriage retracted.
    14. "A" transfer carriage picks up flask 14 and advances it to the Drag Fill station.
    15. Rod 64 retracted, lowering platen 61.
    16. Sequence repeated.

III. Drag Fill Station
  A. Idle Condition
    1. "A" transfer carriage in retracted position.
    2. Frame 155 raised (rods 154 extended).
    3. Motors 158 running, imparting continuous vertical reciprocating motion to platen 156.
    4. Blades 31 rotating.
  B. Sequence
    1. Flask 14 at Pattern Insert station picked up by "A" carriage, moved to Drag Fill station and lowered to rest with outer cope flange 17 on platen 146.
    2. Rods 154 retracted, lowering frame 155 to secure flask 14 to platen 146.
    3. Sand released from hopper 32 to be impelled by blades 31 into drag 20.
    4. Rod 149 extended, moving platen 156 into contact with platen 146, jolting flask 14.
    5. Rod 149 retracted.
    6. Rod 154 extended, moving frame 155 away from flask 14.
    7. "A" carriage retracted.
    8. "A" carriage picks up flask 14 and advances it past pressure roller and strike-off bar 72 73 to the Idler station.
    9. Sequence repeated.

IV. Idler Station
  A. Idler Condition
    1. "A" transfer carriage in retracted position.
    2. Rod 34b in retracted position.
    3. Electromagnetic means 34c disengaged.
  B. Sequence
    1. Flask 14 at Drag Fill station picked up by "A" carriage, moved to the Idler station and lowered to rest on double line 33 of rollers.
    2. "A" carriage retracted.
    3. Electromagnetic means 34c engaged.
    4. Rod 34b extended, pushing flask 14 into Flask Rollover station.
    5. Electromagnetic means 34c disengaged.
    6. Rod 34b retracted.
    7. Sequence repeated.

V. Flask Rollover Station
  A. Idle Condition
    1. Platen 76 down (rod 78 retracted).
    2. Platen 77 down (rod 79 retracted).
    3. Motor 36 disengaged.
  B. Sequence
    Rod 34b pushes flask 14 from Idler station to Flask Rollover station, flask 14 coming to rest on double line 74 of rollers.
    2. Rods 78, 79 extended, securing flask 14 between platens 76, 77.
    3. Motor 36 engaged, rotating shaft 36a and frame 35 through 180°, inverting flask (also rotating shaft 36b).
    4. Rods 78, 79 retracted, releasing flask 14 from between platens 76, 77, flask 14 coming to rest on double line 75 of rollers.
    5. Rod 37b removes flask 14 from Flask Rollover station to Cope Fill station.
    6. Sequence repeated. (Note: Since frame 35 has been inverted, the next flask will be initially supported on double line 75 of rollers.)

VI. Fill Station
  A. Idle Condition

1. Rod 37*b* in retracted position.
2. "B" transfer carriage in advanced position.
3. Electromagnetic means 37*c* disengaged.
4. Blades 31 rotating.

B. Sequence
1. Rod 37*b* extended to flask 14 at Flask Rollover Station.
2. Electromagnetic means 37*c* engaged, securing flask 14.
3. Rod 37*b* partially retracted, pulling flask 14 to Drag Fill station on double line 38 of rollers.
4. Electromagnetic means 37*c* disengaged.
5. Rod 37*b* further retracted.
6. Sand released from hopper 108 to be impelled by blades 31 into cope 15.
7. "B" carriage retracted.
8. "B" carriage picks up flask 14, advances it past strike-off fan 104 and pressure roller 105 to Cope Squeeze station.
9. Sequence repeated.

VII. Squeeze Station
A. Idle Condition
1. Platen 109 down (rod 110 retracted).
2. Diaphragm 113 in unexpanded state.
3. "B" transfer carriage in retracted position.

B. Sequence
1. Flask 14 at Cope Fill station picked up by "B" carriage, moved to Cope Sueeze station and lowered to rest on lugs 106*b*.
2. Rod 110 extended, contacting platen 109 with material in drag 20 and raising flask 14 until projections 114 contact material in cope 15, simultaneously compacting material in cope 15 and drag 20.
3. Air under pressure supplied to chamber 115 through conduit 116, expanding diaphragm 113 and thus forcing projections 114 further into material in cope 15.
4. Chamber 115 exhausted, diaphragm 113 returning to unexpanded state.
5. Rod 110 retracted, lowering flask 14 to lugs 106*b*.
6. "B" carriage retracted.
7. "B" carriage picks up flask 14 and advances it to the Pattern Removal station.
8. Sequence repeated.

VIII Pattern Removal Station
1. Platen 122 raised (rod 125 retracted).
2. Electromagnetic means 123, 124 disengaged.
3. Platen 117 raised (rod 120 extended).
4. Electromagnetic means 118, 119 disengaged.
5. Yoke 39 in retracted position.
6. Rod 132 in retracted position.
7. "B" transfer carriage in retracted position.

B. Sequence
1. Flask 14 at Squeeze station picked up by "B" carriage, moved to Pattern Removal station and lowered to rest on platen 117.
2. Electromagnetic means 118, 119 engaged, securing drag 20 to platen 117.
3. Rod 125 extended, contacting platen 122 with outer cope flange 17.
4. Electromagnetic means 123, 124 engaged, securing cope 15 to platen 122.
5. Yoke 39 extended to support and secure pattern 25 between upper and lower double lines 133, 134 of rollers.
6. "B" carriage retracted.
7. Rod 125 retracted, raising cope 15 to rest on carriage lugs 102.
8. Electromagnetic means 123, 124 disengaged.
9. Rod 120 retracted, lowering drag 20 to rest on carriage lugs 103.
10. Electromagnetic means 118, 119 disengaged.
11. Rod 132 extended, head 131 pushing pattern 25 into Pattern Rollover station. (Note: If a first pattern is in the Pattern Rollover station, movement of a second pattern from the Pattern Removal station will displace the first and force it into the Pattern Insert station.)
12. Rod 132 retracted.
13. Yoke 39 retracted.
14. "B" carriage raised cope 15 and drag 20 and advances each to the Flask Removal station.
15. Rod 120 extended, raising platen 117.
16. Sequence repeated.

IX. Pattern Rollover Station
A. Idle Condition
1. Frame 135 either supports and secures a pattern or not, depending on whether or not a flask has previously undergone pattern removal operations.
2. Motor 36 disengaged.

B. Sequence
1. Pattern 25 pushed by head 131 into position between upper and lower double lines 133, 134 of rollers of frame 135. (Note: If a pattern is in frame 135 at the time, the pattern will be moved to the Pattern Insert station.)
2. Motor 36 is engaged and rotates shaft 36*a*, frame 35, shaft 36*b* and frame 135 though 180°, inverting pattern 25.
3. Motor 36 disengaged.
4. Sequence repeated.

X. Flask Removal Station
A. Idle Condition
1. Rods 142, 143 extended.
2. "B" transfer carriage in retracted position.

B. Sequence
1. Cope 15 and drag 20 at the Pattern Removal station are raised with the "B" carriage, advanced to the Flask Removal station, and lowered to rest with cope 15 supported on inner cope flange 16 by double line 136 of rollers and drag 20 supported on outer drag flange 22 by double line 137 of rollers.
2. "B" carriage retracted.
3. Rods 142, 143 retract, causing heads 138, 139 to contact cope 15 and drag 20 respectively, pulling the sections from the Flask Removal station.
4. Rods 142, 143 xtended.
5. Sequence repeated.

Obviously, many modifications and variations of the above-described invention may be made without departing from the spirit and scope thereof. As an example, the jolt apparatus of the invention may be employed with other mold producing apparatus known in the art or may be adapted to perform other tasks requiring mechanical agitation. Therefore, only such limitations as are indicated in the appended claims should be placed thereon.

What is claimed is:
1. Apparatus for selectively imparting mechanical agitation to a container, said apparatus comprising:
a resiliently mounted agitation source assembly comprising a first horizontally extending member having affixed thereto a pair of double shaft contra- rotating motor means for imparting continuous mechanical agitation to said first horizontally extending member; and a resiliently mounted container retaining and agitation engaging assembly comprising a second horizontally extending member in spaced relation above said first horizontally extending member and adapted to substantially support a container, said second member being rigidly interconnected with selectively engageable means for releasably securing a container to said second member, both said second member and said selectively engageable means being rigidly interconnected with fluid cylinder means for selectively contacting said first member with said second member, whereby said first member may be maintained in a continuous state of mechanical agitation and may be selectively contacted with said second member, imparting mechanical agitation thereto.

2. Apparatus for selectively imparting mechanical agitation to a mold flask, said apparatus comprising:

a resiliently mounted agitating source assembly comprising a first horizontally extending platen having affixed thereto a pair of double shaft contra-rotating motor means for imparting continuous mechanical agitation to said first platen; and a resiliently mounted flask retaining and agitation engaging assembly comprising a second horizontally extending platen in spaced relation above said first platen and adapted to substantially support a mold flask, said second platen being rigidly interconnected with selectively engageable means for reasonably securing a flask to said second platen, both said second platen and said selectively engageable means being rigidly interconnected with fluid cylinder means for selectively contacting said first platen with said second platen, whereby said first platen may be maintained in a continuous state of mechanical agitation and may be selectively contacted with said second platen, imparting mechanical agitation to said second platen and a mold flask secured thereto.

3. Apparatus according to claim 1 wherein said fluid cylinder means comprises hydraulic cylinder means.

4. Apparatus according to claim 2 wherein said fluid cylinder means comprises hydraulic cylinder means.

5. Apparatus according to claim 1, including:

a base frame;

means for resiliently mounting said first horizontally extending member to said base frame; and means for resiliently mounting said second horizontally extending member to said base frame transversely to said first horizontally extending member.

6. Apparatus according to claim 5 wherein said means for resiliently mounting said respective first and second horizontally extending members comprises spring means.

7. Apparatus according to claim 1, wherein said fluid cylinder means includes a fixed end and a movable end, and means for securing said fixed end to said second horizontally extending member and for securing said movable end to said first horizontally extending member.

8. Apparatus according to claim 1, wherein said selectively engageable means includes a pair of fluid cylinder means.

9. Apparatus for selectively imparting mechanical agitation to a container, said apparatus comprising:

1. a base frame;
2. an agitation source assembly comprising a first horizontally extending member, shaft rotating motor means for imparting continuous mechanical agitation to said first horizontally extending member, and means for affixing said shaft rotating motor means to said first horizontally extending member;
3. means for resiliently mounting said agitation source assembly to said base frame;
4. a container retaining and agitation engaging assembly comprising a second horizontally extending member in spaced relation above said first horizontally extending member and adapted to substantially support a container, selectively engageable means for releasably clamping a container to said second member, means for rigidly interconnecting said second member to said selectively engageable means, fluid cylinder means for selectively contacting said first member with said second member, means for rigidly interconnecting said fluid cylinder means to said second member and to said selectively engageable means; and
5. means for resiliently mounting said container retaining and agitation engaging assembly to said base frame;

whereby said first member may be maintained in a continuous state of mechanical agitation and may be selectively contacted with said second member, imparting mechanical agitation thereto.

* * * * *